United States Patent [19]

Alter

[11] Patent Number: 4,824,280
[45] Date of Patent: Apr. 25, 1989

[54] LOCKING ADAPTER FOR INTERCONNECTING A DRIVABLE ELEMENT TO A DRIVE TOOL

[76] Inventor: Allan Alter, 11977 Pavillon, Pierrefonds, Quebec H8Z 1M6, Canada

[21] Appl. No.: 5,608

[22] Filed: Jan. 21, 1987

[51] Int. Cl.$^4$ .......................... F16D 1/00; B25B 13/00
[52] U.S. Cl. .................................... 403/322; 403/328; 81/177.85
[58] Field of Search ...................... 279/1 A, 82, 22, 30; 81/177.85, 177.2, 177.1; 403/287, 325, 328, 322, 324, 374

[56] References Cited

U.S. PATENT DOCUMENTS

| | | |
|---|---|---|
| 37,022 | 11/1862 | Winslow . |
| 389,005 | 9/1888 | Peck . |
| 432,278 | 7/1890 | Maschmeyer . |
| 898,431 | 9/1908 | Brightman ............................ 279/30 |
| 1,635,909 | 7/1927 | Tabeler ................................ 279/30 |
| 1,834,466 | 6/1932 | Peterson . |
| 2,162,359 | 6/1939 | Rhinevault .......................... 403/328 |
| 2,727,767 | 12/1955 | Lehman et al. . |
| 3,851,890 | 12/1974 | Smith ................................ 279/82 X |
| 4,318,630 | 3/1982 | Herchenbach et al. ............. 403/322 |
| 4,404,714 | 9/1983 | Duran .............................. 403/322 X |
| 4,480,511 | 11/1984 | Nickipuck ....................... 403/325 X |
| 4,502,365 | 3/1985 | Hacker . |
| 4,571,113 | 2/1986 | Coren ............................... 403/328 X |
| 4,614,457 | 9/1986 | Sammon ............................. 403/322 |

Primary Examiner—Andrew V. Kundrat
Assistant Examiner—Peter M. Cuomo

[57] ABSTRACT

An adapter device for interconnecting a drivable element to a drive, such as a ratchet or an impact tool. The device comprises a body having a connecting shank protruding therefrom. The shank has an automatic lock for locking engagement in a cavity of a drivable element. The automatic lock has a roller bearing displaceable in a bearing cavity formed in a flat wall of the shank. The bearing cavity has an angulated roller guide wall on which the roller bearing is displaced to position the roller bearing to an engaging and disengaged position. A spring biased linkage is connected to the roller bearing to normally bias the bearing to the engaging position. The body is further provided with a locking cavity further having an automatic locking element whereby to connect the body to a drive to impart a motion to the connecting shank.

13 Claims, 2 Drawing Sheets

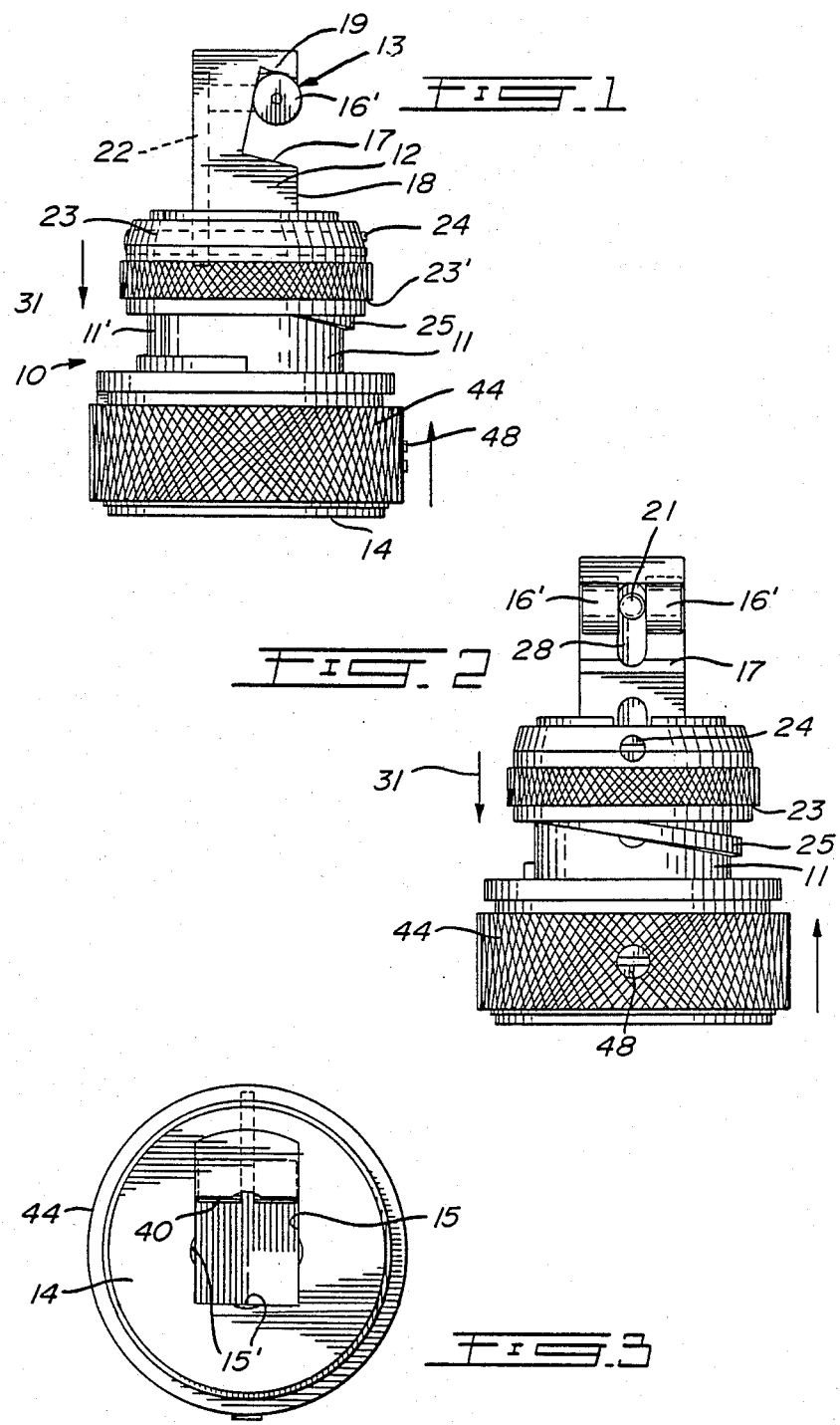

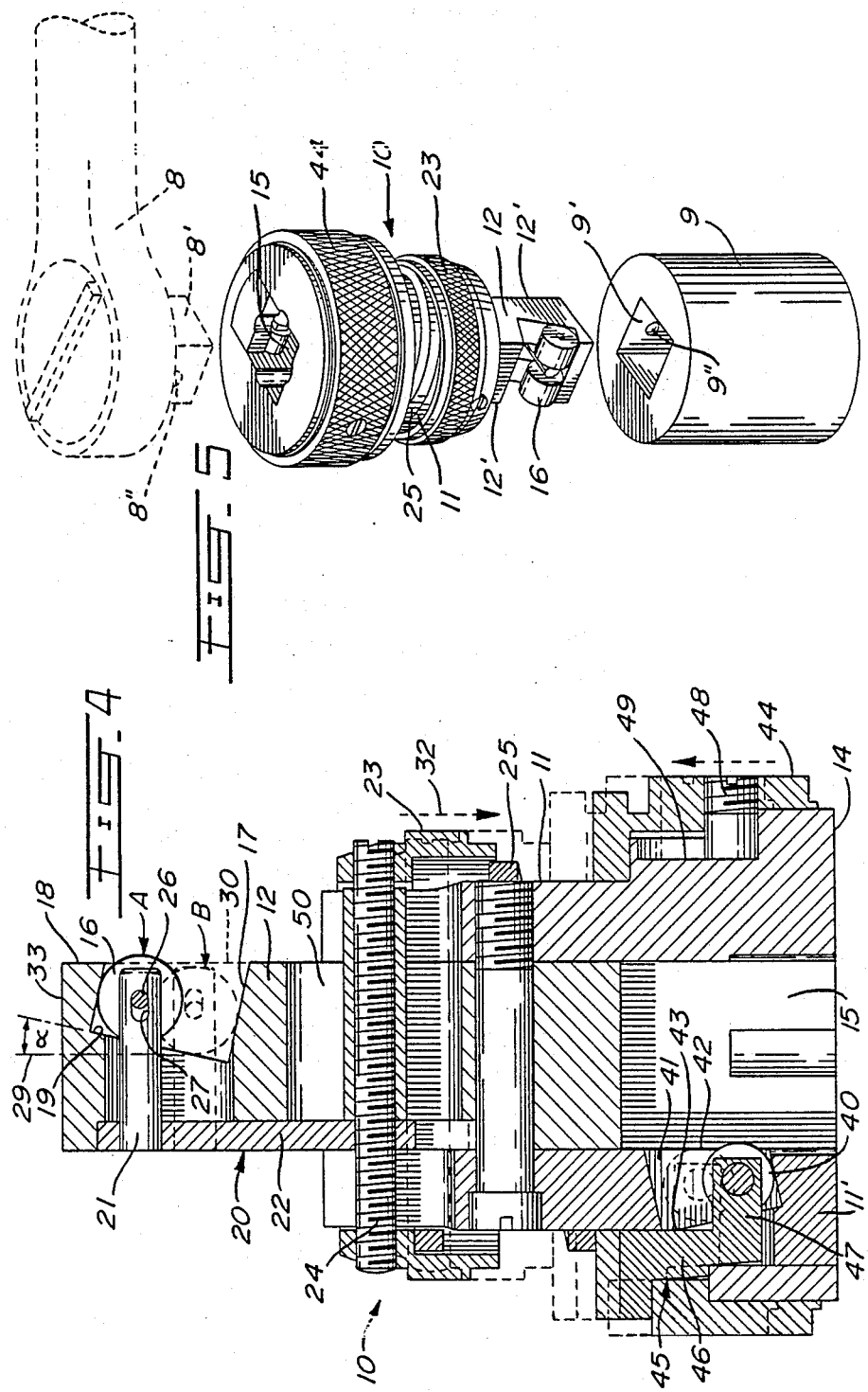

LOCKING ADAPTER FOR INTERCONNECTING A DRIVABLE ELEMENT TO A DRIVE TOOL

BACKGROUND OF THE INVENTION (a) Field of the Invention

The present invention relates to a locking adapter for interconnecting a drivable element, such as a ratchet socket, to a drive tool, such as a ratchet wrench or electric drive tool, and particularly to a locking adapter which automatically connects to the drive tool and the drivable element, in any position, and capable of being quickly disconnected therefrom.

(b) Description of the Prior Art

Locking joints, extensions or adapters for interconnecting a drive shank to a drivable element, such as a socket, are well known in the art. For example, such devices are disclosed and illustrated in U.S. Pat. Nos. 4,480,511, issued Nov. 6, 1984, and 4,571,113, issued Feb. 18, 1986. However, such devices do not provide for the adapter to automatically connect both the drivable element and the drive tool. Another disadvantage of such prior art is that usually the shank of the drivable element can only be fitted in the connecting cavity of the adapter device by positioning it in a precise position. Usually these shanks have a ball bearing or pin extending from a wall thereof and this ball or pin must be aligned with a cavity formed in the side wall of the connecting cavity of the adapter device. It is therefore necessary to see the cavity to determine how to position the shank of the drivable element.

Another disadvantage of prior art adapters is that often it is necessary to retract a locking element before the connecting shank of the adapter is secured within a socket cavity. This is the case for example in U.S. Pat. No. 4,480,511, referred to hereinabove. Also, such adapters do not have automatic locking cavities to secure them to drive tools and it is often necessary to interconnect these devices by lock pins retained by O-rings, which are difficult and time-consuming to install and may also fail under stress.

A still further disadvantage of known prior art adapter devices of this type is that the devices themselves are not suitable for actuation by the fingers of the user, due primarily to their geometrical configuration and construction. Still further, these adapters are usually constructed for use with a particular drive tool and are not adaptable to other type drive tools such as torque wrenches, impact wrenches, air ratchets, universal drives, flexible extensions, etc.

SUMMARY OF THE INVENTION

It is a feature of the present invention to provide an improved adapter device for interconnecting a drivable element to a drive means and which substantially overcomes all of the above-mentioned disadvantages of the prior art.

Another feature of the present invention is to provide an improved adapter device for interconnecting a drivable element to a drive means and which device is automatically connectable to both the drivable element and the drive means and is easily disconnectable therefrom.

Another feature of the present invention is to provide an improved adapter device for interconnecting a drivable element to a drive means and wherein the device has the universal feature of being connectable to either the drivable element or the drive means, in any position.

Another feature of the present invention is to provide an improved adapter device for interconnecting a variety of drivable elements to a variety of drive tools without having to modify the adapter device.

Another feature of the present invention is to provide an improved adapter device for interconnecting a drivable element to a drive means and which is easy to use and can be connected or disconnected without having to have visibility of this operation.

Another feature of the present invention is to provide an improved adapter device for interconnecting a drivable element to a drive means and wherein there is provided a thumb drive to ease removing and starting the threading of fasteners such as nuts and bolts.

According to the above features, from a broad aspect, the present invention provides an adapter device for interconnecting a drivable element to a drive means. The device comprises a body having a connecting shank protruding therefrom. The shank has automatic lock means for locking engagement of the shank in a cavity of a drivable element. The lock means has a roller bearing displaceable in a bearing cavity formed in a flat wall of the shank. The bearing cavity has an angulated roller guide wall on which the roller bearing is displaced to position the roller bearing to an engaging and disengaged position. Biasing means is provided to normally bias the roller bearing to the engaging position. The body is further provided with a connecting means to connect the body to a drive means to impart a motion to the connecting shank.

BRIEF DESCRIPTION OF THE DRAWINGS

A preferred embodiment of the present invention will now be described with reference to the example thereof as illustrated in the accompanying drawings, in which:

FIG. 1 is a side view of the adapter device of the present invention;

FIG. 2 is another side view from the right side of FIG. 1;

FIG. 3 is a rear view of the adapter device showing the position of the connecting cavity;

FIG. 4 is a partly fragmented and partly sectioned side view of the adapter device of the present invention; and FIG. 5 is a perspective view illustrating the adapter device of the present invention as connectable to a socket and a socket wrench.

DESCRIPTION OF THE PREFERRED EMBODIMENTS

Referring now to the drawings, and more particularly to FIGS. 1, 2 and 5, there is shown generally at 10 the adapter device of the present invention for interconnecting a drivable element, a drive socket 9, to a drive means, herein a ratchet wrench 8 (see FIG. 6). The adapter device 10 comprises a body 11 having a connecting shank 12 protruding from the body. The connecting shank 12 has an automatic lock means 13 for locking engagement of the shank 12 within the cavity, such as 9′, of the drivable socket element 9. In the opposite wall or end 14 of the adapter 10 there is provided a locking cavity 15 to connect the adapter device to a drive means, such as the drive shank 8′ of the ratchet wrench 8, as shown in FIG. 6, whereby to impart rotation to the connecting shank 12 and hence the socket 9.

The automatic lock means 13 is provided with a roller bearing 16 which is displacable in a bearing cavity 17 formed in a flat wall 18 of the shank 12. The bearing cavity 17 is provided with an angulated roller guide wall 19 on which the roller bearing 16 is displaced whereby to position the roller bearing to an engaging position, such as shown at A in FIG. 4, to a disengaged position, such as shown at B in FIG. 4. Biasing means is provided to normally bias the roller bearing 13 to the engaging position A.

As shown more clearly in FIG. 4, the biasing means comprises a spring-biased linkage which is connected to the roller bearing and consisting of a roller support rod 21 connected to a guided link rod 22. The guided link rod 22 is secured to an annular ring 23 via a connecting pin 24. The annular ring 23 is displaceably supported about a cylindrical portion 11' of the body 11 and concentrically with the shank 12. A helical spring 25 is located on the underside 23' of the annular ring 23 and urges the annular ring 23 toward the shank whereby to maintain the roller bearing 16 at the engaging position A, as shown in FIG. 4.

As seen more clearly in FIGS. 2 and 4, the roller bearing 16 is constituted by two roller wheels 16' each having a uniform outer circumferential face. The roller wheels are supported on a common axle 26 extending through a guide slot 27 provided adjacent a free end of the roller bearing support rod 21. Each of the roller wheels 16' is disposed on the respective side of the rod 21. The bearing support rod extends through a slot 28 in the roller guide wall 19.

As shown clearly in FIG. 4, the angulated roller guide wall 19 is inclined with respect to the longitudinal axis 29 of the connecting shank 12 and spaced inwardly of the plane 30 of the flat wall 18. The roller bearing when at its engaging position has a circumferential portion extending outwardly of the plane 30 of the flat wall 18 whereby to automatically lock within a socket cavity such as cavity 9' when positioned therein. When the free end of the connecting shank 12 is positioned within the socket cavity 9' the bearing wheel 16 will move inwardly of its cavity 17 and be squeezed between the guide wall 19 and a side wall of the cavity 9', whereby to wedge the connecting shank 12 within the socket cavity. This is done automatically simply by inserting the connecting shank 12 within the cavity 9'. In order to release the wedging effect of the bearing roller 16, it is only necessary to pull back on the annual ring 23 in the direction of arrow 31 (see FIG. 2) whereby to retract the guided link rod 22 in the direction of arrow 32 thereby causing the roller support rod 21 to also move the roller bearing towards position B wherein the roller bearing is now located inside the plane 30 of the flat wall 18. Accordingly, the wedging effect is now removed and the socket 9 would simply fall from the shank by its gravitational weight or the socket is simply removed by hand by pulling on it if the shank is pointed at a position above the horizontal.

As shown in FIG. 4, the roller guide wall 19 is inwardly inclined from a free end at 33 of the connecting shank and spaced inwardly therefrom. The guide wall is preferably inclined at an angle from the longitudinal axis 29 of the shank and this angle is preferably in the range of 13° to 14° with respect to the longitudinal axis 29 or the wall 18'. These angles have been found to be the most suitable to prevent slippage or to prevent making the connection too secure and hard to release.

In the end wall 14 there is provided the connecting means or locking cavity 15 whereby to secure the adapter device 10 to a drive, such as the ratchet wrench 8. As previously described, the locking cavity 15 is located in the end wall 14 of the body 11. This cavity is of square cross-section and provided with guide channels 15' to accommodate the guide pin or ball 8" of the ratchet shank 8', in any position.

A further roller bearing 40 is disposed within a roller bearing cavity 41 formed within an inner flat side wall 42 of the cavity 15. This further roller bearing is also displaceable on an angulated bearing guide wall 43 and operates in the same manner as previously described with reference to roller bearing 16. This further roller bearing is also biased or urged to an engaging position, whereby to automatically engage with a drive shank, such as shank 8' of wrench 8, when positioned in the locking cavity 15.

A disconnect annular ring 44 is also displaceably supported about a connecting end portion 11" of the body 11 and concentrically with the locking cavity 15. A roller bearing support linkage 45 interconnects the disconnect annular ring 44 to the roller bearing 40. The same helical spring 25 also urges the disconnect annular ring 44 in the direction of the end wall 14. The helical spring 25 is retained captive between the disconnect annular ring 44 and the previously described annular ring 23 associated with the shank roller bearing 13.

Briefly, the linkage mechanism 45 comprises a guided link rod 46 to which is secured a disconnect annular ring 44 and a bearing support rod 47 which is secured to the roller bearing 40. This roller bearing 40 is of the same construction as the previously described roller bearing 16 and will not again be described in detail. It is also connected to the bearing support rod in a similar manner for displacement. Also, the angulated roller guide wall 43 is also disposed at the same angle as the guide walls associated with the cavity provided in the shank this angle being relative to the longitudinal axis or the side wall 42 of the locking cavity 15.

As shown in FIG. 4, the concentric displacement of the annular ring 44 is limited by a guide screw 48 extending through the ring 44 and into a guide or securing cavity 49. Similarly, the connecting pin 24 associated with the annular ring 23 is also movable within a guide cavity 50 located within an inner portion of the shank 12 and also limits the travel of the annular ring 23. Accordingly, the spring 25 may be retained in a compressed state between both rings.

Another feature of the present invention is that the construction of the adapter device makes it easy to assembly and disassembly and to repair. These annular rings 23 and 44 also have their outer surfaces knurled whereby to provide positive finger engagement and prevent slipping when engaged. These rings can conveniently be utilized to initiate the rotation of a screw or bolt engaged by the socket, such as socket 9, before the drive tool, such as 8, is applied to effect the final tightening or to remove a screw or bolt after the initial untightening is effected by a drive tool.

It can be seen that with the roller bearing automatic lock means 13 and 40, the connecting shank 12 and the locking cavity 15 can be engaged, respectively, by simply inserting the shank 12 in a socket cavity 9' or inserting the connecting shank 8' of a drive tool such as the ratchet 8 into the locking cavity 15. The shank 12 may have bevelled corners 12' to facilitate insertion in sockets such as at 9. Usually, the socket cavities are provided with a cavity 9" to receive therein the guide pin or ball 8" of the ratchet shank 8' to effect locking engagement. With the roller bearing of the present invention the shank can be placed at any position within the socket cavity and will engage therewith. This is also similarly so with respect to the locking cavity. Accordingly, the adapter device of the present invention can be utilized in total darkness and this is particularly useful when, for example, a mechanic is working under a vehicle or under the hood of a vehicle in an area not visible to him and the work is effected simply by feeling the location of bolts, the ratchet shank and socket cavities only.

It is within the ambit of the present invention to cover any obvious modifications of the example of the preferred embodiment described herein, provided such modifications fall within the scope of the appended claims. For example, the adapter of the present invention may be utilized to connect percussion tools to drivable elements such as chiselling bits, etc. Also, the drive tool can be an air ratchet, impact wrench, torque wrench, etc. Thus, it can be seen that the adapter device of the present invention may have a variety of applications and is almost a universal type adapter and can be constructed of various sizes, depending on its application. Also, the adapter of the present invention can connect to socket cavities or drive shanks which may be loosely fitted in view of the automatic locking action of the roller bearing. Thus, it can accommodate sockets and drive shanks with tolerances up to 40/1,000 of an inch play.

I claim:

1. An adapter device for interconnecting a drivable element to a drive means, said device comprising a body having a connecting shank protruding therefrom, said shank having automatic lock means for automatic locking engagement of said shank on a flat wall of a cavity of a drivable element when positioned therein at any orientation, said lock means having a roller bearing with an outer circular wall displaceable in a bearing cavity formed in a flat wall of said shank, said bearing cavity having a flat angulated roller guide wall on which said roller bearing is displaced to position said roller bearing to an engaging and disengaged position, biasing means to normally bias said roller bearing to said engaging position, said biasing means having a spring biased linkage connected to said roller bearing, said spring biased linkage having a roller support rod, said roller bearing being displaceably connected to said support rod, said spring biased linkage having a guided link rod to which is secured said bearing support rod an annular ring member displaceably supported about a portion of said body and concentrically with said shank, a fastener interconnecting said guided link rod to said annular ring member, and said biasing means including a helical spring urging said annular ring member toward said shank to urge said roller bearing to said engaging position, said body having a locking cavity to connect said body to said drive means to impart an axial rotating motion to said connecting shank, said locking cavity being located in an end of said body opposed to said connecting shank and axially aligned therewith, and connecting means in said locking cavity for automatic locking engagement with a drive shank of said drive means positioned in said locking cavity at any orientation, said lock means of said connecting shank and said connecting means of said locking cavity being connected to a respective disconnect means for disengagement of said lock means and connecting means.

2. An adapter device as claimed in claim 1, wherein said roller bearing is constituted by two roller wheels each having a uniform outer circumferential face, said roller wheels being supported on a common axle, said axle extending through a guide slot provided adjacent a free end of said roller support rod, each said roller wheels being disposed on a respective side of said bearing support rod, said bearing support rod extending through a slot in said roller guide wall.

3. An adapter device as claimed in claim 1, wherein said angulated roller guide wall being inclined with respect to the longitudinal axis of said connecting shank and spaced inwardly of the plane of said flat wall of said shank, said roller bearing when at said engaging position having a circumferential portion thereof extending outwardly of said plane of said flat wall, said roller bearing when at said disengaged position lying entirely within said plane of said flat wall.

4. An adapter as claimed in claim 3, wherein said roller guide wall is inwardly inclined from a free end of said connecting shank, said bearing cavity being spaced inwardly of said free end.

5. An adapter as claim in claim 4, wherein said guide wall is inclined at an angle from 13° to 14° with respect to the longitudinal axis of said connecting shank.

6. An adapter as claimed in claim 1, wherein said connecting means in said locking cavity is a further roller bearing displaceable in an inner flat side wall of said locking cavity, said further roller bearing being displaceable on an angulated bearing guide wall, said biasing means urging said further roller bearing to an engaging position whereby to automatically engage with said drive shank of a drive tool when said drive shank is positioned in said locking cavity.

7. An adapter as claimed in claim 6, wherein there is further provided a disconnect annular ring displaceably supported about a connecting end portion of said body and concentrically with said locking cavity and constituting said disconnect means, and a roller bearing support linkage interconnecting said disconnect annular ring to said further roller bearing, and said helical spring urging said disconnect annular ring toward said end of said body having said locking cavity.

8. An adapter as claimed in claim 7, wherein said helical spring is retained captive between said disconnect annular ring and a further disconnect annular ring also displaceably supported about said body and associated with said linkage of said roller of said roller bearing of said connecting shank, said further disconnect annular ring also constituting said finger engaging disconnect means, said helical spring urging both said roller bearings to their engaging positions whereby to effect automatic locking.

9. An adapter as claimed in claim 8, wherein said roller bearing support linkage associated with said further roller bearing comprises a further guided link rod to which is secured said disconnect annular ring associated with said roller bearing of said locking cavity and axially displaced thereby, and a further bearing support rod secured to said guided link rod of said further roller bearing, said further roller bearing having two roller wheels each having a flat outer circumferential face, said roller wheels being supported on a common axle extending through a guide slot provided adjacent a free end of said further bearing support rod.

10. An adapter as claimed in claim 8, wherein both said disconnect annular rings have a finger gripping outer surface.

11. An adapter as claimed in claim 6, wherein said angulated bearing guide wall associated with said further roller bearing is inclined at an angle from the longitudinal axis of said locking cavity in the range of from 13° to 14°, said guide wall being disposed in a roller bearing cavity in said inner flat side wall and spaced from said end of said body containing said locking cavity.

12. An adapter as claimed in claim 6, wherein said locking cavity and said connecting shank are of square cross-section.

13. An adapter as claimed in claim 1, wherein said drivable element is a wrench socket, said drive means being a ratchet wrench.

* * * * *